Jan. 15, 1963  G. H. ECKELS ETAL  3,073,455
DERRICK
Original Filed March 16, 1960  5 Sheets-Sheet 1

INVENTORS
GEORGE H. ECKELS AND
CURTIS W. VERRELL
BY
Teare & Fetzer
ATTORNEYS

Jan. 15, 1963

G. H. ECKELS ETAL 3,073,455

DERRICK

Original Filed March 16, 1960

INVENTORS
GEORGE H. ECKELS AND
CURTIS W. VERRELL

BY

*Teare + Fetzer*

ATTORNEYS

Jan. 15, 1963 G. H. ECKELS ETAL 3,073,455
DERRICK
Original Filed March 16, 1960 5 Sheets-Sheet 3

INVENTORS
GEORGE H. ECKELS AND
CURTIS W. VERRELL
BY
Teare + Fetzer
ATTORNEYS

INVENTORS
GEORGE H. ECKELS AND
CURTIS W. VERRELL

BY Teare + Fetzer
ATTORNEYS

Jan. 15, 1963 G. H. ECKELS ETAL 3,073,455
DERRICK
Original Filed March 16, 1960 5 Sheets-Sheet 5

INVENTORS
GEORGE H. ECKELS AND
CURTIS W. VERRELL
BY
Teare & Fetzer
ATTORNEYS

United States Patent Office 3,073,455
Patented Jan. 15, 1963

3,073,455
DERRICK
George H. Eckels, Lakewood, and Curtis W. Verrell, Fairview Park, Ohio, assignors to Holan Corporation, Cleveland, Ohio, a corporation of Ohio
Original application Mar. 16, 1960, Ser. No. 15,298. Divided and this application Jan. 12, 1961, Ser. No. 82,190
11 Claims. (Cl. 212—55)

This invention relates to derricks and more particularly to portable derricks, such as are adapted for instance to be mounted on motor trucks or other types of vehicles. This application is a division of the United States patent application of George H. Eckels and Curtis W. Verrell, filed March 16, 1960, under Serial No. 15,298.

Such derricks are conventionally mounted on utility type vehicles for handling various objects, such as telephone or telegraph poles, and may be employed to advantage in conjunction with other types of equipment, such as an earth boring tool, for expeditiously performing all the necessary work operations associated with setting a utility line pole in proper place along a thoroughfare or the like.

Accordingly, an object of the invention is to provide an improved power operated derrick or crane particularly adapted for mounting on a vehicle.

A further object of the invention is to provide a derrick having an extendible boom and including means for attaching an associated work mechanism, such as an earth boring tool, to the boom, and whereby means are provided in conjunction with the tool attaching means for selectively securing the associated work mechanism to either the extendible boom section or the relatively stationary section of the boom, thereby greatly increasing the range of movement and the usability of the associated work mechanism.

A still further object of the invention is to provide a powered derrick or crane which has a greatly improved range of movement as compared to heretofore known arrangements, which is particularly adapted for use in handling utility line poles and the like, and which includes means for supporting an associated work mechanism, such as an earth boring tool thereon, and in a novel manner, for selective positioning of the work mechanism over substantially the full range of movement of the derrick.

Briefly, the foregoing objects are accomplished by the provision of a derrick comprising an extendible boom pivotally mounted on a base member for movement from a forward, inactive, carried position overlying the vehicle, to rearward load supporting position. The base is corner mounted on the vehicle and adapted for rotary movement in a generally horizontal plane about a generally vertical axis. Novel support means is provided on the boom for mounting an associated working mechanism, such as an earth boring tool, thereon, and latch and locking means are provided for selectively coupling the tool supporting means to either the extendible section of the boom upon such actuation of the latter, or the working mechanism may be detachably secured to the relatively stationary section of the boom, for convenient utilization of the extendible boom section without interference from the working mechanism.

Other objects and advantages of the invention will be apparent from the following description taken in conjunction with the accompanying drawings in which:

FIG. 1 is a side elevational view of a utility truck employing a derrick constructed in accordance with the invention; the mechanism for rotating the derrick in its horizontal plane of movement has been eliminated in the FIG. 1 showing for purposes of simplicity; in full lines, the carried position of the derrick on the vehicle is illustrated, with such full line showing illustrating the extendible boom in retracted condition; in dotted lines projecting forwardly from such full line showing, an extended condition of the derrick boom is illustrated; and in dot-dash lines, various load carrying positions of the derrick boom are illustrated and partially in a diagrammatic manner, when the latter has been swung rearwardly from carried position on the vehicle;

Figure 1:
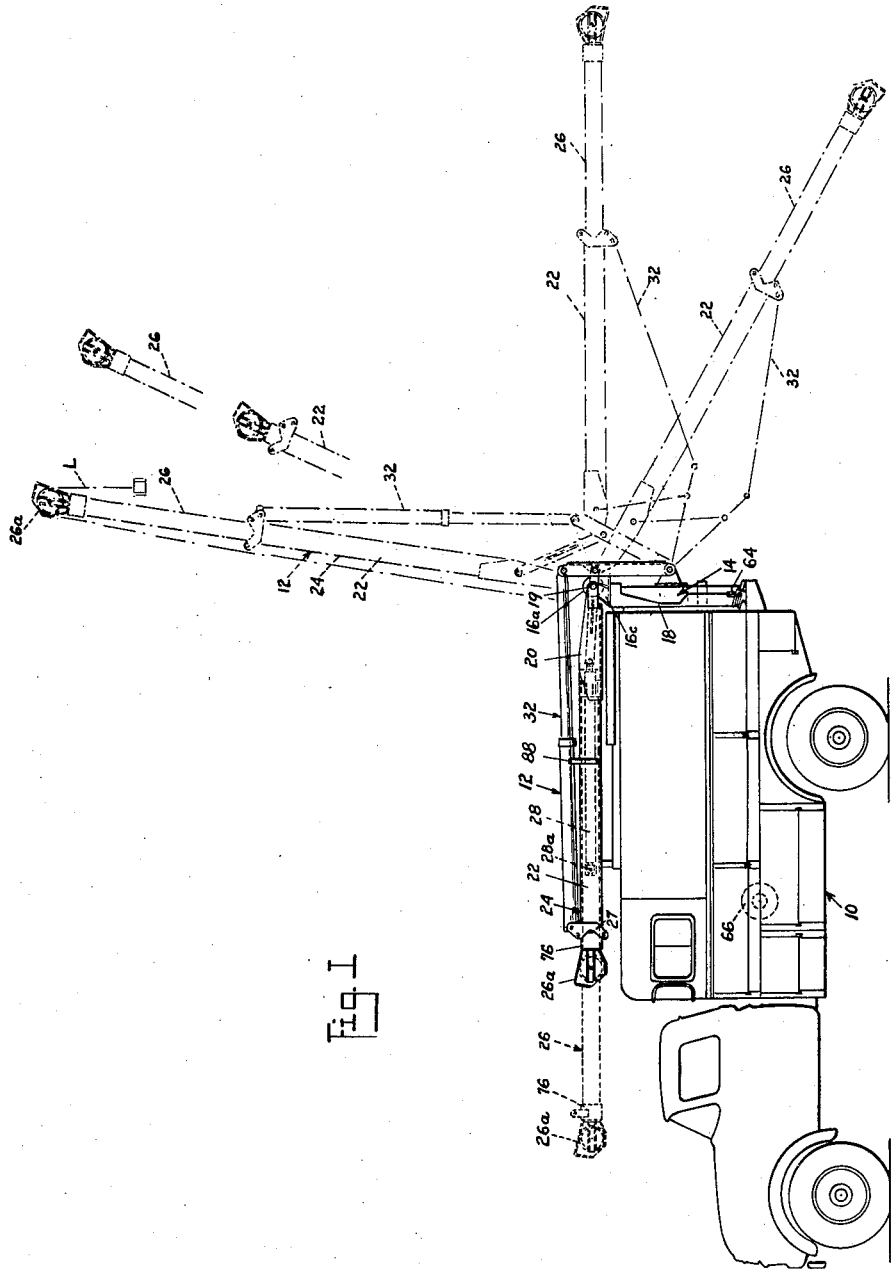
Figure 2:
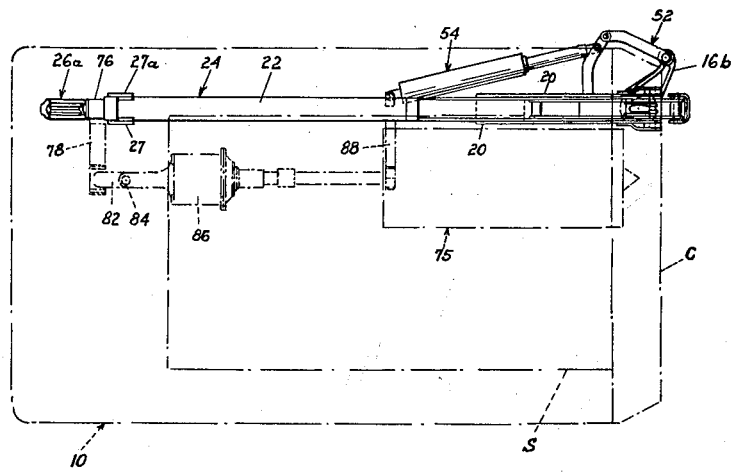
FIG. 2 is a top plan view of the derrick of FIG. 1, illustrating the same in inactive carried position on the vehicle, and showing the motor unit and associated linkage mechanism for rotating the derrick in its horizontal plane of movement; in phantom lines, an associated work tool, which in the embodiment illustrated represents an earth boring tool, is shown secured to the derrick.
Figure 4:
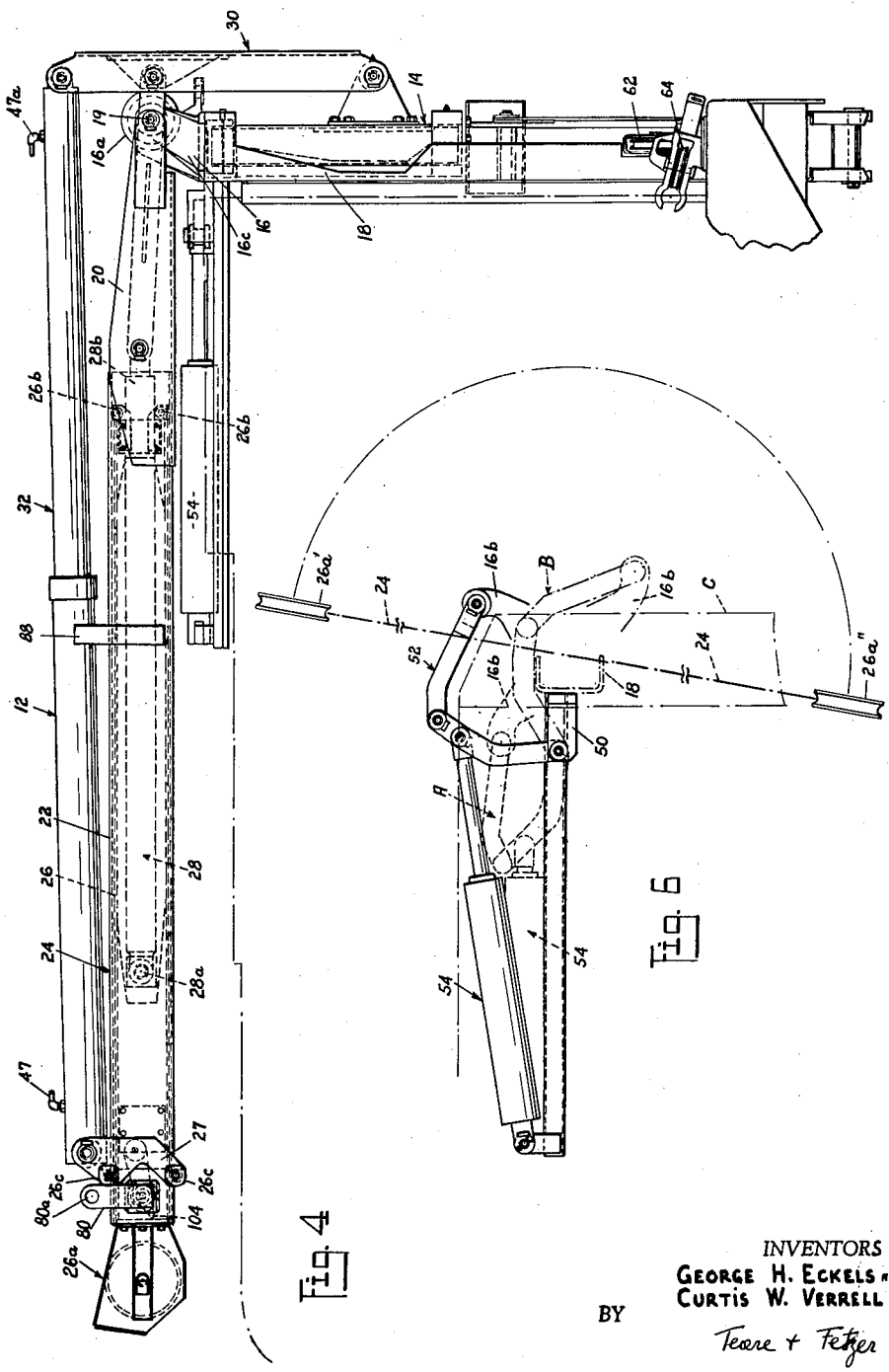
FIG. 4 is an enlarged, side elevational, detail view of the derrick mechanism as mounted on a truck, and illustrates the structure providing for extension of the outer section of the boom with respect to the inner section thereof.
Figure 7:
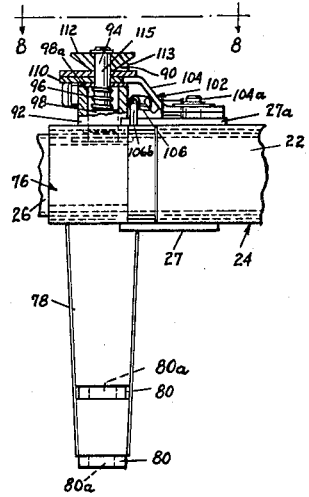
Figure 8:
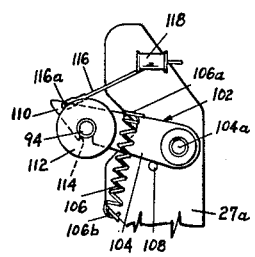
Figure 9:
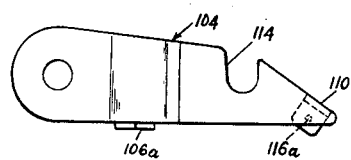
Figure 10:
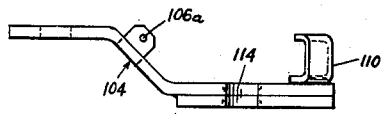
Figure 11:
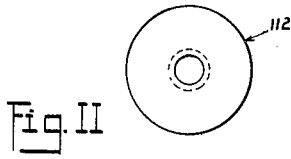
Figure 12:
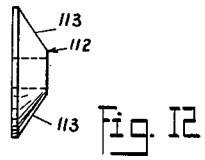
Figure 13:
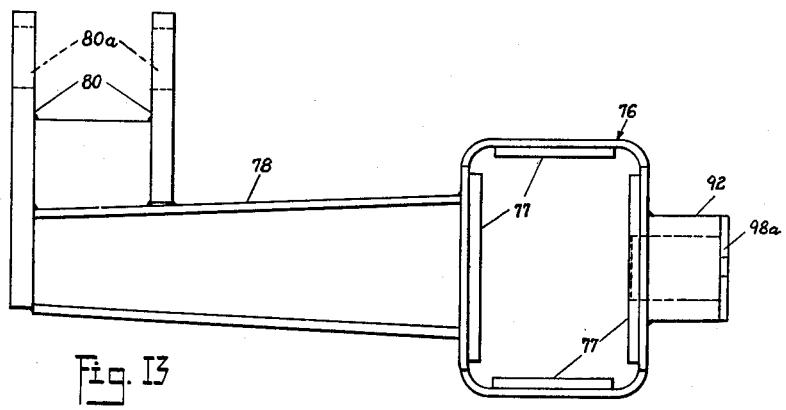
Figure 14:
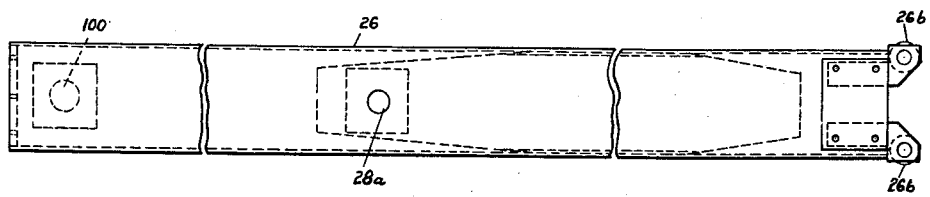

FIG. 6 is an enlarged, fragmentary, detail view of the motor unit and associated linkage mechanism for swiveling or rotating the derrick base through an arc of 180°, for lateral, transverse, and rearward positioning of the derrick with respect to the mounting vehicle; in full lines, the position of the parts are illustrated as disposed when the derrick boom is either in a forward carried position as illustrated, in full lines in FIG. 1, or in rearwardly swung load carrying position as illustrated in dot-dash lines in FIG. 1; in dotted lines in FIG. 6, the position of the parts are illustrated as disposed when the derrick base has been rotated by the motor unit to position the derrick boom laterally to one side of the vehicle; and in dot-dash lines, the position of the parts are illustrated as disposed when the derrick base has been rotated by the motor unit to position the derrick boom generally transverse of the vehicle for convenient body loading and unloading from the vehicle;

FIG. 7 is an enlarged, fragmentary, partially sectioned, top plan view illustrating the outer end portion of the relatively stationary inner section of the extendible boom of the derrick, together with the collar device for mounting an associated work mechanism, such as the earth boring tool illustrated in FIG. 2 of the drawings, on the extendible boom, and showing the latching and the locking mechanism which provides for selectively securing the collar device to either the outer extendible section of the boom, or to the inner relatively stationary section of the boom;

FIG. 8 is a fragmentary view, taken substantially along the plane of line 8—8 of FIG. 7, looking in the direction of the arrows, and illustrating the latching mechanism in latched condition with the collar device for maintaining the latter in coupled relation to the inner relatively stationary section of the extendible boom; FIG. 8 represents a view taken from the opposite side of the boom as that illustrated in FIG. 4;

FIG. 9 is an enlarged, elevational, detail view of the latching lug shown in FIGS. 7 and 8;

FIG. 10 is a top plan view of the FIG. 9 showing;

FIG. 11 is an enlarged, elevational, detail view of the cam member of the latching lug assembly shown in FIGS. 4, 7 and 8, which cam member provides for automatically unlocking the collar member from the extendible outer section of the boom, and locking it to the relatively stationary inner section of the boom, upon retraction of the extendible boom section to its innermost position;

FIG. 12 is an end elevational, detail view of the FIG. 11 showing;

FIG. 13 is an enlarged, end elevational view of the collar device shown in FIGS. 4, 7 and 8 of the drawings;

FIG. 14 is an enlarged, broken, detail view of the outer extendible section of the derrick boom.

Referring now again to the drawings, and in particular to FIG. 1, there is shown a wheeled utility vehicle 10 having a truck body which carries the derrick 12 of the invention thereon. The derrick is corner mounted on the truck chassis for rotary movement in a generally horizontal plane so that the derrick possesses a considerable lateral, rearward, and transverse range of movement, particularly useful in setting utility line poles in position along a right-of-way, without the necessity of continual moving and maneuvering of the truck itself.

The derrick comprises base structure 14 which is mounted in relatively stationary relation on the corner of the truck chassis, such base structure comprising a rotatable or swivel head portion 16 (FIGS. 1, 4) which is suitably journaled on the stationary portion 18 (FIGS. 1, 4) of the base structure, for rotary movement in a generally horizontal plane of movement. The head portion 16 rotatably mounts a sheave member 16a (FIG. 4) at its upper end, and includes a horizontally projecting arm 16b (FIG. 2) for use in rotating the head portion. Head portion 16 also includes generally upstanding ears 16c (FIGS. 1 and 4) thereon, which pivotally mount, as at 19, laterally spaced leg sections 20 of the inner or lower, relatively stationary section 22 of the boom 24 of the derrick. The boom 24 also embodies an outer extendible section 26 (FIGS. 1 and 14) which is received in telescoping relation in the lower or inner section 22 of the boom. Such outer extendible section mounts a conventional sheave assembly 26a, at its outer end. Interior rollers 26b (FIG. 4) are provided on the inner end of the extendible section 26, and exterior roller members 26c, are mounted by means of brackets 27, 27a on the outer end of relatively stationary section 22 of the boom, for facilitating the sliding telescopic movement of the extendible section 26 with respect to the relatively stationary section 22 of the boom. The relatively movable boom sections 22 and 26 are preferably of rectangular configuration in transverse cross section, and are substantially hollow, with the extendible boom section 26 mounting a fluid powered, double acting, reciprocal motor unit 28 therein, such as at 28a, and with the other end of the motor unit 28 (such as the outer end of the piston rod of the motor unit) being suitably anchored as at 28b to the relatively stationary section 22 of the boom. Accordingly it will be seen that selective supplying of fluid pressure to the motor unit 28 will selectively move or slide the outer extendible section 26 lengthwise with respect to the relatively stationary section 22 of the boom.

The boom, as aforementioned, is pivotally mounted as at 19 to the head portion 16 of base structure 14, and a linkage erecting or actuating arrangement 30 (FIG. 4) is provided, together with a double acting reciprocal fluid powered motor unit or ram 32, for moving the derrick in a generally vertical plane and through an arc of movement in excess of 180°.

Referring now to FIG. 1, the inactive or forwardly carried position of the derrick is shown in full lines with the derrick being disposed in a generally horizontal position overlying the vehicle. When it is desired to swing or erect the derrick through its vertical arc of movement to a work or load carrying position, pressurized fluid is fed to motor unit 32 as via distributing port 47 (FIG. 4) thus causing inward telescoping relation of the latter, and thus pulling the derrick upwardly and rearwardly about its pivotal connection 19 to head 16 of the base structure of the derrick. In FIG. 1 there is shown various work or load carrying positions of the derrick in its vertical plane of movement, and it will be seen that the range of movement thereof is in excess of 180° from the derrick's inactive or carried position to its maximum rearwardly swung position.

To collapse the derrick and return it to its carried position, or to swing it forwardly about the pivot 19 to change its work position in its load supporting portion of its vertical arc of movement, pressurized fluid is fed to the inner end of the extendible motor unit 32 as via fluid distributing port 47a, to cause outward telescoping movement of the motor unit 32 and pivot the derrick boom about its pivotal connection 19 of the vehicle.

Referring now to FIG. 6, the arrangement for rotating the base of the derrick in a generally horizontal plane and through a horizontal working arc of 180° is as follows: A bracket 50 is secured to the stationary portion 18 of base structure 14 and an articulated linkage arrangement 52 is provided coacting between bracket 50 and aforementioned arm 16b on the rotatable head portion 16, together with a double acting reciprocal motor unit 54, for rotating the rotatable head portion 16 in the aforementioned horizontal arc of movement. The full line position of linkage 52 and motor unit 54 represents the position of the rotary head portion 16 when the boom 24 is either in a storage position, overlying the truck chassis in parallel alignment with the lengthwise vertical center plane of the truck chassis and as shown in full lines in FIG. 1, or when the boom has been moved through a vertical arc about its pivotal connection 19 to the head portion and thus to rearward load supporting position but still disposed in a vertical plane parallel to the vertical center plane of the truck chassis. In dotted lines identified by the letter A, the position of the linkage 52 and associated actuating motor unit 54 is illustrated for positioning the boom laterally to project outwardly from the corresponding side of the truck, for use as for instance in conveniently setting a utility line pole along a thoroughfare, with the truck located parallel to the curb of the thoroughfare, and with the boom 24 having been pivoted about its pivotal connection 19 and as by means of the aforementioned motor unit 32 to a load carrying position. In such position, the location of the winch line sheave 26a on the outer end of the boom has been illustrated and designated by the number 26a'. In dot-dash lines referred to by the letter B, the position of the arm 16b of the rotatable head 16 and associated actuating linkage 52 has been shown when the ram 54 has been extended to rotate head portion 16 and associated projecting arm 16b, 180° from the "A" position to thereby swing the boom 24, when in loading position, 180°, whereby the winch line sheave 26a on the outer end of the boom is disposed in the position designated by number 26a'', for readily utilizing the boom to load and/or unload objects, such as a pole, from the truck body itself. It will be seen that in the latter position of the boom and winch line sheave, the latter is actually disposed forwardly of the rear end C of the truck, and convenient to the open space S on the truck body for effective loading and unloading thereof.

Figure 3:
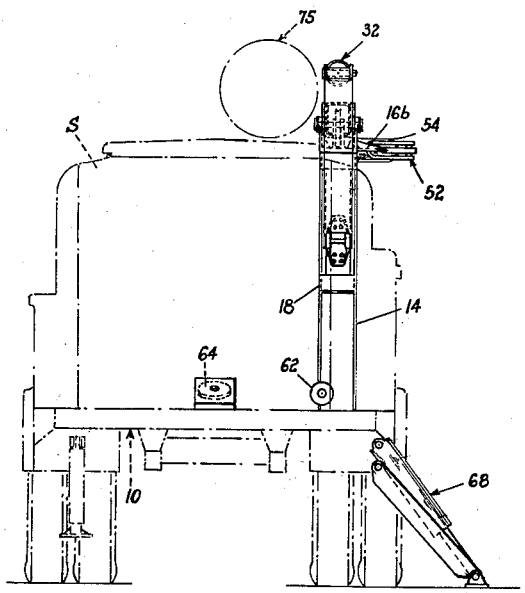
FIG. 3 is a rear end, elevational view of the derrick as mounted on the truck, with the derrick being in the inactive carried position illustrated in FIG. 2.

Referring now to FIGS. 1, 3 and 4, the winch line L of the derrick may pass about sheave 26a on the outer end of the boom 24, then along the boom to aforementioned sheave 16a, rotatably mounted on the head portion 16 of the base of the derrick, then down along the base to sheave 62, rotatably mounted on stationary base structure 14, then laterally to a rotatable sheave 64 disposed in generally horizontal position on the truck body and then forwardly to a preferably powered winch mechanism 66, for actuating the load line L in any position of the derrick.

Figure 5:
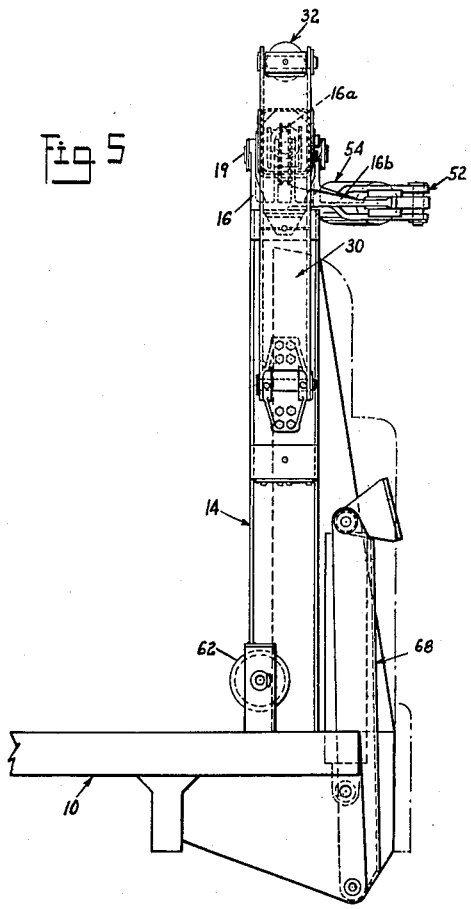
FIG. 5 is an enlarged, fragmentary, elevational view taken from the right hand end of FIG. 4.

A hydraulically actuated stabilizing jack mechanism 68, FIGS. 3 and 5, may be provided on the corner of the truck on which the derrick is mounted, for stabilizing the truck chassis during utilization of the derrick.

Referring now to FIGS. 7, 8, 9, 10, 11 and 12, the latter best illustrate the novel arrangement, which is the essence of the invention of the instant divisional application, for selective coupling of an associated work tool, such as the earth borer mechanism 75 diagrammatically illustrated in FIG. 2, to either the extendible section 26 of the boom or to the section 22 of the boom. Such an arrangement comprises a collar or tool supporting member 76 (FIG. 13), formed complementary to and encompassing the extendible section 26 of the boom, and preferably having wear plates 77 secured about its interior, for receiving in relatively movable relation the extendible section 26 of the boom. The collar embodies an arm 78 projecting laterally outwardly from one side thereof and which includes attaching lugs 80 at its outer end. Lugs 80 are apertured as at 80a for receiving therebetween pivoted member 82, (FIG. 2), the latter being pivotally connected as at 84 to the power unit 86 of earth boring tool 75. The earth boring tool may be conveniently supported on the truck when the derrick is in carried position by arm or bracket 88 (FIGS. 2 and 4), projecting laterally outwardly from the section 22 of the boom, and rigidly attached thereto.

Locking mechanism 90 (FIG. 7) is provided for locking collar 76 to the extendible section 26 of the boom when it is desired to carry the work tool 75 and supporting collar 76 outwardly with extension of the outer section 26 of the boom with respect to the inner section 22 thereof. Such locking means comprises a housing section 92 (FIGS. 7 and 13), projecting laterally of the collar in a direction opposite to the direction of projection of arm 78. A plunger 94 is slidably mounted in housing 92 and a compression spring 96 coacts between the head 98 (FIG. 7) of the plunger and the confronting wall 98a of housing 92 to resiliently urge plunger 94 transversely and inwardly toward the collar 76 and extendible section 26 of the boom.

An opening 100 (FIG. 14) complementary to the head 98 of the plunger 94 is formed in the confronting side of extendible section 26 of the boom, for receiving the plunger head therein, and upon occurrence of the latter, the collar 76 and associated working tool 75 will be locked to the extendible section 26 of the boom and will be carried outwardly therewith upon extension of the boom by actuation of motor unit 28. Thus the working tool 75 can be readily positioned lengthwise of the boom by locking the collar 76 to the extendible section 26 of the boom and actuating motor unit 28.

Latching mechanism 102 (FIGS. 7, 8, 9, 10, 11 and 12) is provided for automatically latching the collar 76 and supported working tool 75 to the inner, relatively stationary section 22 of the boom 24 upon retraction of the extendible section 26 of the boom its full amount within the inner boom section. Such latching mechanism comprises a latch member 104 pivoted as at 104a to support bracket 27a on the outer end of the inner section 22 of the boom, and a tension spring element 106, coacting between the latch 104 as at 106a and attaching lug 106b on the bracket 27a for urging the latch member 104 into latching position. A stop 108 (FIG. 8) is provided on bracket 27a for engagement with the latch 104, and limiting its upward pivotal movement under the action of spring 106. The latch 104 comprises a sharpened or converging head portion 10 (FIGS. 9 and 10), adapted for camming coaction with truncated lift cone element 112 mounted on the outer end of plunger element 94, for automatically moving the plunger element 94 laterally outwardly against the resistance to compression of spring 96 upon coacting camming engagement between head portion 110 of the latch 104 and the inwardly converging cam surfaces 113 of the truncated lift cam member 112. The head portion 110 of the latch is provided with an upwardly opening slot 114 therein which receives the shank 115 (FIG. 7) of the plunger when the collar 76 is latched to the inner section 22 of the boom. A flexible element, such as cable 116 (FIG. 8), is secured to the head of the latch member as at 116a and is passed through a cable tube 118 secured to bracket 27a, and then is strung to any convenient location for ready accessibility to the derrick operator, to provide for deactivating the latch 104 and permitting the plunger to engage in complementary opening 100 in the extendible section 26 of the boom. It will be seen that by pulling on cable 116, the latch 104 is pivoted downwardly out of latching engagement with plunger 94 and against the resistance to tension of spring 106, to thereby permit the spring 96 to urge the plunger head 98 into opening 100 in the confronting side of the extendible section 26 of the boom. The resistance to tension of latch spring 106 is greater than the resistance to compression of plunger spring 96, and therefore the plunger will normally be readily urged out of complementary opening 100 in the outer boom section upon camming coaction between head portion 110 of latch 104 and cam member 112. It will be seen therefore that the latch member 104 provides an arrangement whereby the work tool supporting collar member 76 and associated work tool will be automatically coupled to the inner, relatively stationary section of the boom upon retraction of the outer extendible section 26 into the inner, relatively stationary section 22, to thereby permit subsequent extension of the boom without interference from the work tool, and for use as for instance in loading and unloading purposes, and which may be readily deactivated, to cause automatic coupling of the collar 76 and associated work tool to the extendible section 26 of the boom, to permit carrying of the work tool outwardly with the boom, and adjustment of the position of the work tool lengthwise with respect to the boom and for the full operating range of the boom extension.

The terms and expressions which have been employed are used as terms of description and not of limitation and there is no intention in the use of such terms and expressions of excluding any equivalents of the features shown or described, or portions thereof, but it is recognized that various modifications are possible within the scope of the invention claimed.

We claim:
1. In a portable type derrick comprising a boom, said boom comprising an inner section and an outer section, said outer section being adapted for relative lengthwise movement with respect to said inner section for varying the effective length of said boom, means for moving said outer boom section lengthwise relative to said inner boom section, and means on said boom for attaching an associated work mechanism thereto, said last mentioned means comprising a work mechanism supporting member mounted on said outer boom section, said outer boom section being movable lengthwise with respect to said supporting member, means for coupling said supporting member to said outer boom section for movement therewith relative to said inner boom section, and means for coupling said supporting member to said inner boom section for movement of said outer boom section relative to said supporting member and to said inner boom section.

2. A portable type derrick in accordance with claim 1, wherein said supporting member comprises an arm extending laterally outwardly with respect to said boom, and means on the free end of said arm for pivotally attaching the associated work mechanism thereto.

3. In a portable type derrick comprising a boom, said boom comprising an outer section and an inner section, said outer section being adapted for relative lengthwise movement with respect to said inner section for varying the effective length of said boom, means for moving said outer boom section lengthwise relative to said inner boom section, and means on said boom for attaching an associated work mechanism thereto, said last mentioned means comprising a work mechanism supporting member mounted on said outer boom section, said outer boom section being movable lengthwise with respect to said supporting member, means for automatically coupling said supporting member in predetermined position to said outer boom section for movement therewith relative to said inner boom section, and means for automatically uncoupling said supporting member from said outer boom section and automatically coupling the same to said inner boom section upon retraction of said outer boom section a predetermined amount with respect to said inner boom section, for subsequent movement of said outer boom section relative to said inner boom section and said coupled supporting member.

4. In a portable type derrick comprising a boom, said boom comprising an inner section and an outer section, said outer section being adapted for relative lengthwise movement with respect to said inner section for varying the effective length of said boom, means for moving said outer boom section lengthwise relative to said inner boom section, and means on said boom for attaching an associated work mechanism thereto, said last mentioned means comprising a collar encompassing said outer boom section, said outer boom section being movable lengthwise with respect to said collar, said collar comprising an arm projecting laterally of said outer boom section, means on said arm for attaching the work mechanism thereto, a plunger mounted on said collar for transverse movement with respect to said outer boom section, resilient means urging said plunger transversely toward said outer boom section, means on said outer boom section adapted for coaction with said plunger for locking said collar in predetermined position on said outer boom section for lengthwise movement therewith and with respect to said inner boom section, a cam member mounted on the outer end of said plunger, a latch member pivotally mounted on the outer end of said inner boom section, resilient means urging said latch member to predetermined position with respect to said inner boom section and with respect to said cam member, said latch member coacting with said cam to retract said plunger out of coaction with said means on said outer boom section upon retraction of said outer boom section a predetermined amount with respect to said inner boom section, to thereby automatically uncouple said collar from said outer boom section, said latch member coacting with said plunger upon retraction of the latter out of locking coaction with said outer boom section to automatically couple said collar to said inner boom section whereby said outer boom section may be moved lengthwise with respect to said collar and said inner boom section, and means for deactivating said latch member and pivoting it from its said predetermined position against the resistance of its associated resilient means.

5. A portable derrick in accordance with claim 4 wherein said means on said outer boom section which is adapted for locking coaction with said plunger comprises an opening in the surface of said outer boom section which confronts said plunger, said opening being adapted to receive the inner end of said plunger therein to lock said collar to said outer boom section.

6. A portable type derrick in accordance with claim 4, wherein said means for deactivating said latch member comprises a flexible element secured to said latch member outwardly therealong from the pivotal connection of said latch member to said inner boom section, said flexible member extending from said latch member to a predetermined location readily accessible to the derrick's operator for convenient pivotal deactivation of said latch member by the machine operator, and means on said boom for guiding said flexible element to said predetermined location.

7. A portable type derrick in accordance with claim 4, including stop means on said boom for limiting the movement of said latch member to said predetermined position with respect to said inner boom section and said cam member.

8. A portable type derrick in accordance with claim 4, wherein the free end of said latch member is of convergent configuration and wherein said cam member is of inwardly convergent truncated configuration for camming coaction, to thereby automatically deactivate said plunger member upon retraction of said outer boom section said predetermined amount with respect to said inner boom section.

9. A portable derrick adapted for mounting on a support for rotary movement in a generally horizontal plane and for swinging movement in a generally vertical plane, said derrick comprising a boom, said boom including an inner section and an outer section adapted for lengthwise telescoping relation with said inner section for varying the effective length of said boom, means including a reciprocal motor unit for telescoping said outer boom section with respect to said inner boom section, and means carried by said boom for attaching a working tool thereto, the last mentioned means comprising a supporting member mounted on said outer boom section, said last mentioned section being adapted for relative lengthwise movement with respect to said supporting member, locking means on said supporting member adapted for coaction with means on said outer boom section to lock said supporting member to said outer boom section for movement therewith, and latching means on said inner boom section adapted for latching coaction with said supporting member to couple the latter to said inner boom section whereby said outer boom section may be moved with respect to said inner boom section and coupled supporting member.

10. A portable derrick in accordance with claim 9 including means for automatically unlocking said supporting member from said outer boom section and automatically coupling said last mentioned member to said latching means upon retraction of said outer boom section a predetermined amount with respect to said inner boom section.

11. In a portable type derrick comprising a boom, said boom comprising an inner section and an outer section, said outer section being adapted for relative lengthwise movement with respect to said inner section for varying the effective length of said boom, means for moving said outer boom section lengthwise relative to said inner boom section, and means on said boom for attaching an associated work mechanism thereto, said last mentioned means comprising a work mechanism supporting member mounted on said outer boom section, said outer boom section being movable lengthwise with respect to said supporting member and said inner boom section, and means for selectively coupling said supporting member to said outer boom section for movement of said supporting member with said outer boom section and relative to said inner boom section.

References Cited in the file of this patent
UNITED STATES PATENTS

| | | |
|---|---|---|
| 2,568,959 | Illies | Sept. 25, 1951 |
| 2,959,398 | Troche | Nov. 8, 1960 |